Figure 1:
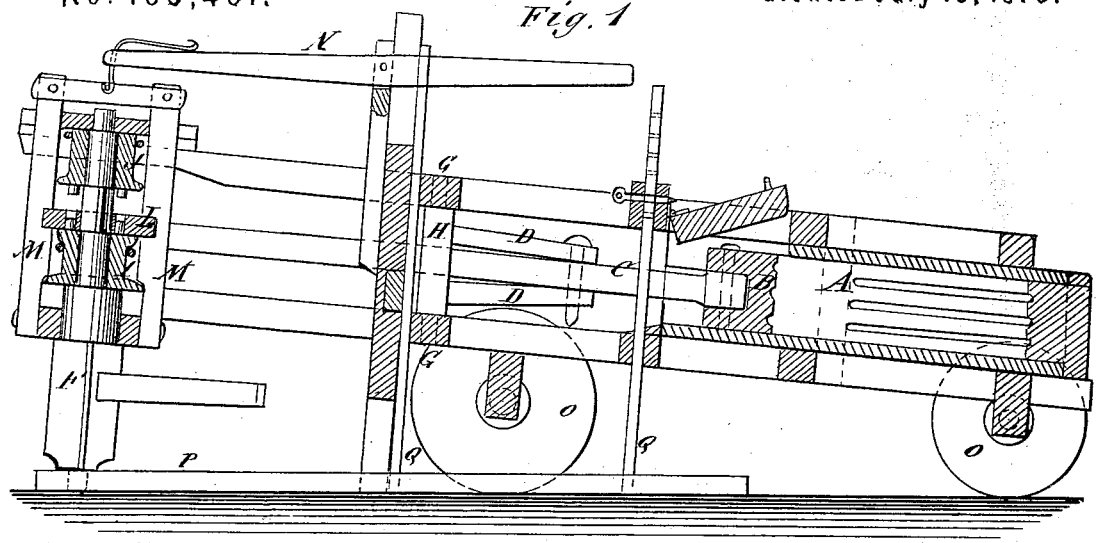

J. P. KEFAUVER.
Presses.

No. 165,491. Patented July 13, 1875.

WITNESSES:         INVENTOR:
                   J. P. Kefauver
                   BY
                   ATTORNEYS.

UNITED STATES PATENT OFFICE.

JACOB P. KEFAUVER, OF MADISONVILLE, TENNESSEE.

IMPROVEMENT IN PRESSES.

Specification forming part of Letters Patent No. 165,491, dated July 13, 1875; application filed May 28, 1875.

*To all whom it may concern:*

Be it known that I, JACOB P. KEFAUVER, of Madisonville, in the county of Monroe and State of Tennessee, have invented a new and Improved Press, of which the following is a specification:

The invention will first be described in connection with the drawing, and then pointed out in the claim.

Figure 2:
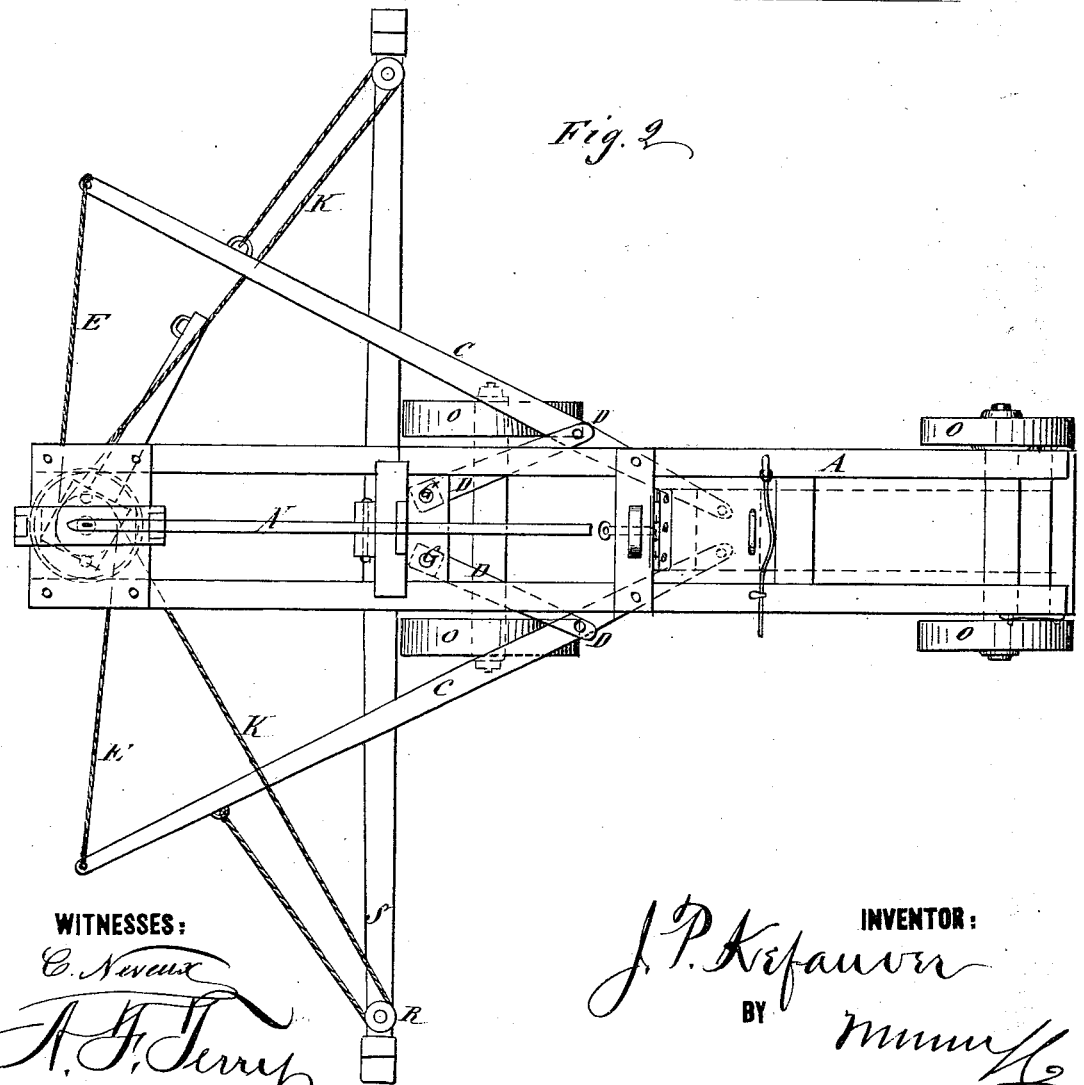

Figure 1 is a longitudinal sectional elevation of my improved press. Fig. 2 is a plan view.

Similar letters of reference indicate corresponding parts.

A is the press-case; B, the follower; C, the levers for working the follower; D, the toggle-levers, to which the principal levers are pivoted; E, the ropes; and F the windlass, onto which the ropes are wound to operate the levers. The levers D are pivoted at G in strong standards H, which are free to turn to allow the toggle-levers to swing into the line of the principal levers, and thus force the follower into the case. The windlass has two drums, I and J. The ropes E, for pulling up the levers to press the bale, work on the drum I, and other ropes, K, work on the drum J, for pulling the follower back, the latter ropes being arranged on pulleys R on the lateral supports S. The drums are fitted loosely on the shaft, and there is a clutch, L, between them, which connects one drum and disconnects the other by shifting up or down on the shaft. It is shifted by the sliding bars M and the lever N. The frame which supports the case is mounted on truck-wheels O, to be moved from place to place, and the lower end of the capstan is pivoted in a bed-piece, P, which rests on the ground when the machine is at work, and along the front portion is connected to the frame by the vertically-adjustable bars Q, by which it can be pressed hard down on the ground to hold the windlass when at work, and can be raised above it and fastened to hold it up, so as to slide along the ground readily when the machine is to be moved.

Having thus described my invention, I claim as new and desire to secure by Letters Patent—

The combination, with follower-levers C C, of arms having pulleys R R, the ropes K E, and a windlass having drums I J, as and for the purpose specified.

J. P. KEFAUVER.

Witnesses:
JOHN MINIS,
R. K. ROBINSON.